United States Patent
Ozawa

(10) Patent No.: US 9,854,117 B2
(45) Date of Patent: Dec. 26, 2017

(54) INFORMATION PROCESSING SYSTEM INCLUDING DEVICE PROVIDED WITH CIRCUIT CAPABLE OF CONFIGURING LOGIC CIRCUIT ACCORDING TO CIRCUIT INFORMATION AND PLURALITY OF CONTROL UNITS

(71) Applicant: CANON KABUSHIKI KAISHA, Tokyo (JP)

(72) Inventor: Manabu Ozawa, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/960,562

(22) Filed: Dec. 7, 2015

(65) Prior Publication Data

US 2016/0165084 A1 Jun. 9, 2016

(30) Foreign Application Priority Data

Dec. 9, 2014 (JP) .................................. 2014-249432

(51) Int. Cl.
*H04N 1/00* (2006.01)
*H04N 1/32* (2006.01)

(52) U.S. Cl.
CPC ..... *H04N 1/00888* (2013.01); *H04N 1/00949* (2013.01); *H04N 1/00954* (2013.01); *H04N 1/32* (2013.01); *H04N 1/32561* (2013.01); *H04N 1/32598* (2013.01)

(58) Field of Classification Search
None
See application file for complete search history.

(56) References Cited

U.S. PATENT DOCUMENTS

| | | | | |
|---|---|---|---|---|
| 5,349,647 A | * | 9/1994 | Freiburg | G06F 13/124 345/502 |
| 6,819,453 B1 | * | 11/2004 | Suzuki | G06T 5/20 358/1.9 |
| 7,495,970 B1 | * | 2/2009 | Tang | G11C 29/028 326/39 |
| 7,669,035 B2 | * | 2/2010 | Young | G06F 13/4265 710/104 |

(Continued)

FOREIGN PATENT DOCUMENTS

JP 2008287571 A 11/2008

*Primary Examiner* — Ted Barnes
(74) *Attorney, Agent, or Firm* — Canon USA, Inc., IP Division

(57) ABSTRACT

An information processing system includes a device including a circuit for configuring a logic circuit according to circuit information, a first control unit configured to process a first job by using a first logic circuit configured in the circuit according to first circuit information, the first control unit being connected to the device, and a second control unit configured to process a second job by using a second logic circuit configured in the circuit according to second circuit information, the second control unit being connected to the device, wherein the device can configure a logic circuit in the circuit according to circuit information transmitted from the first control unit, and wherein the first control unit transmits the first circuit information to the device to configure the first logic circuit in the circuit, and transmits the second circuit information to the device to configure the second logic circuit in the circuit.

21 Claims, 9 Drawing Sheets

(56) References Cited

U.S. PATENT DOCUMENTS

| | | | |
|---|---|---|---|
| 8,400,646 B2* | 3/2013 | Yamada | H04N 1/0096 358/1.13 |
| 2005/0110518 A1* | 5/2005 | Kanno | G06F 17/5054 326/39 |
| 2005/0128515 A1* | 6/2005 | Ohno | H04N 1/00204 358/1.15 |
| 2006/0028694 A1* | 2/2006 | Soda | H04N 1/32358 358/426.06 |
| 2006/0039373 A1* | 2/2006 | Nakamura | H04L 12/12 370/389 |
| 2010/0146257 A1* | 6/2010 | Yamamoto | G06F 9/5038 713/100 |
| 2010/0225948 A1* | 9/2010 | Sato | H04N 1/00965 358/1.13 |
| 2010/0245878 A1* | 9/2010 | Yamada | H04N 1/0096 358/1.13 |
| 2010/0271668 A1* | 10/2010 | Hasui | H04N 1/00954 358/474 |
| 2010/0315682 A1* | 12/2010 | Nakamura | H04L 12/12 358/1.15 |
| 2011/0109931 A1* | 5/2011 | Nomura | H04N 1/0097 358/1.13 |
| 2011/0216247 A1* | 9/2011 | Nishida | H03K 19/17756 348/725 |
| 2011/0225415 A1* | 9/2011 | Yamada | H03K 19/17752 713/100 |
| 2011/0231640 A1* | 9/2011 | Avadhanam | G06F 9/4403 713/2 |
| 2011/0235078 A1* | 9/2011 | Hara | G06F 3/1211 358/1.13 |
| 2012/0030329 A1* | 2/2012 | Aoki | H04N 1/00347 709/223 |
| 2012/0039537 A1* | 2/2012 | Keys | H04N 1/00183 382/182 |
| 2012/0105884 A1* | 5/2012 | Matsumura | G06F 9/445 358/1.13 |
| 2013/0063772 A1* | 3/2013 | Bae | G06F 3/1204 358/1.15 |
| 2013/0250353 A1* | 9/2013 | Hara | G06K 15/1857 358/1.15 |
| 2014/0006766 A1* | 1/2014 | Ito | G06F 9/44505 713/2 |
| 2014/0142750 A1* | 5/2014 | Ahn | B25J 9/00 700/245 |
| 2014/0192210 A1* | 7/2014 | Gervautz | G06K 9/228 348/207.1 |
| 2014/0244981 A1* | 8/2014 | Okada | G06F 15/7867 712/220 |
| 2015/0052344 A1* | 2/2015 | Matsumoto | H03K 19/017581 713/100 |
| 2015/0229804 A1* | 8/2015 | Shinto | H04L 67/34 358/1.16 |
| 2015/0244898 A1* | 8/2015 | Tanaka | H04N 1/32496 358/1.13 |
| 2015/0256687 A1* | 9/2015 | Shinto | H04N 1/0083 358/1.15 |
| 2015/0261478 A1* | 9/2015 | Obayashi | H04N 1/00896 358/1.15 |

* cited by examiner

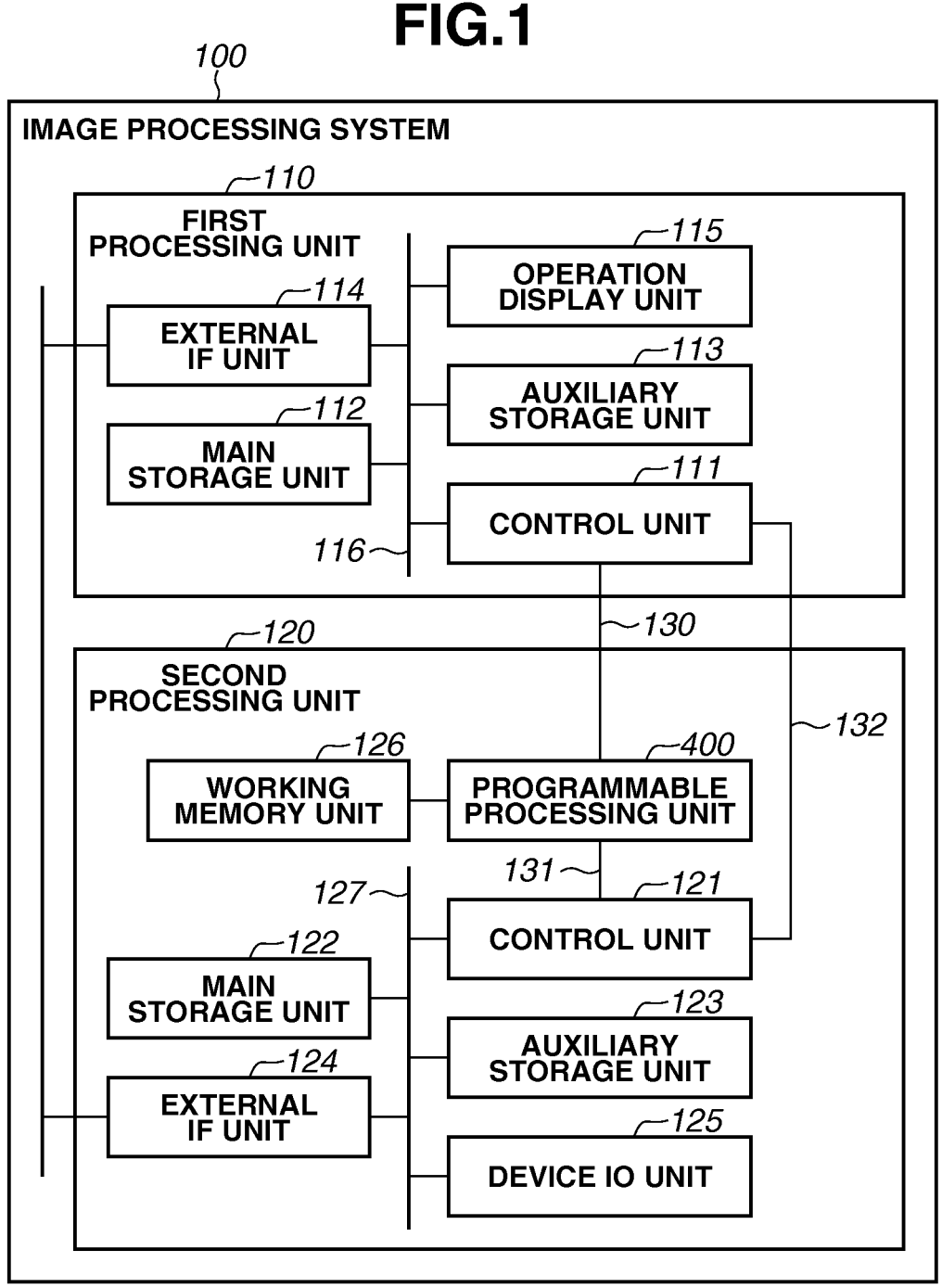

FIG. 2A

| JOB DATA | | | |
|---|---|---|---|
| JOB ID | JOB REQUEST FUNCTION | JOB SETTING PARAMETERS | |
| | | IMAGE PROCESSING UNIT SETTING DATA | IMAGE SOURCE |

FIG. 2B

| JOB REQUEST FUNCTION | SUPPORT DEVICE | USE OF PROGRAMMABLE PROCESSING UNIT | CIRCUIT INFORMATION |
|---|---|---|---|
| EXTENDED OCR FUNCTION | FIRST PROCESSING UNIT | YES | ADV_OCR.config |
| OBJECT RECOGNITION FUNCTION | SECOND PROCESSING UNIT | YES | OBJ_ASYS.config |
| PHOTOGRAPHIC IMAGE PROCESSING FUNCTION | FIRST PROCESSING UNIT | YES | PHOTO.config<br>ADV_Img_Process01.config<br>ADV_Img_Process02.config |
| POWER CONTROL | FIRST PROCESSING UNIT | NO | — |

FIG. 2C

| JOB REQUEST FUNCTION | SUPPORT DEVICE | USE OF PROGRAMMABLE PROCESSING UNIT | CIRCUIT INFORMATION |
|---|---|---|---|
| EXTENDED OCR FUNCTION | SECOND PROCESSING UNIT | YES | ADV_OCR.config |
| OBJECT RECOGNITION FUNCTION | SECOND PROCESSING UNIT | YES | OBJ_ASYS.config |
| SENSOR PROCESSING 1 | SECOND PROCESSING UNIT | NO | — |
| SENSOR PROCESSING 2 | SECOND PROCESSING UNIT | YES | ADV_Sencing.config<br>ADV_Img_Process01.config<br>ADV_Img_Process02.config |

FIG.3A

| PR POSITION | SUPPORT DEVICE | CIRCUIT INFORMATION |
|---|---|---|
| PR1 | — | empty |
| PR2 | SECOND PROCESSING UNIT | ADV_Img_Process01.config |
| PR3 | SECOND PROCESSING UNIT | ADV_Img_Process02.config |
| PR4 | FIRST PROCESSING UNIT | ADV_OCR.config |
| PR5 | SECOND PROCESSING UNIT | OBJ_ASYS.config |
| PR6 | — | empty |
| PR7 | FIRST PROCESSING UNIT | PHOTO.config |
| PR8 | — | empty |
| PR9 | — | empty |
| PR10 | — | empty |

FIG.3B

| PR POSITION | SUPPORT DEVICE | CIRCUIT INFORMATION |
|---|---|---|
| PR1 | — | empty |
| PR2 | SECOND PROCESSING UNIT | ADV_Img_Process01.config |
| PR3 | SECOND PROCESSING UNIT | ADV_Img_Process02.config |
| PR4 | FIRST PROCESSING UNIT | ADV_OCR.config |
| PR5 | SECOND PROCESSING UNIT | OBJ_ASYS.config |
| PR6 | SECOND PROCESSING UNIT | ADV_Sencing.config |
| PR7 | FIRST PROCESSING UNIT | PHOTO.config |
| PR8 | — | empty |
| PR9 | — | empty |
| PR10 | — | empty |

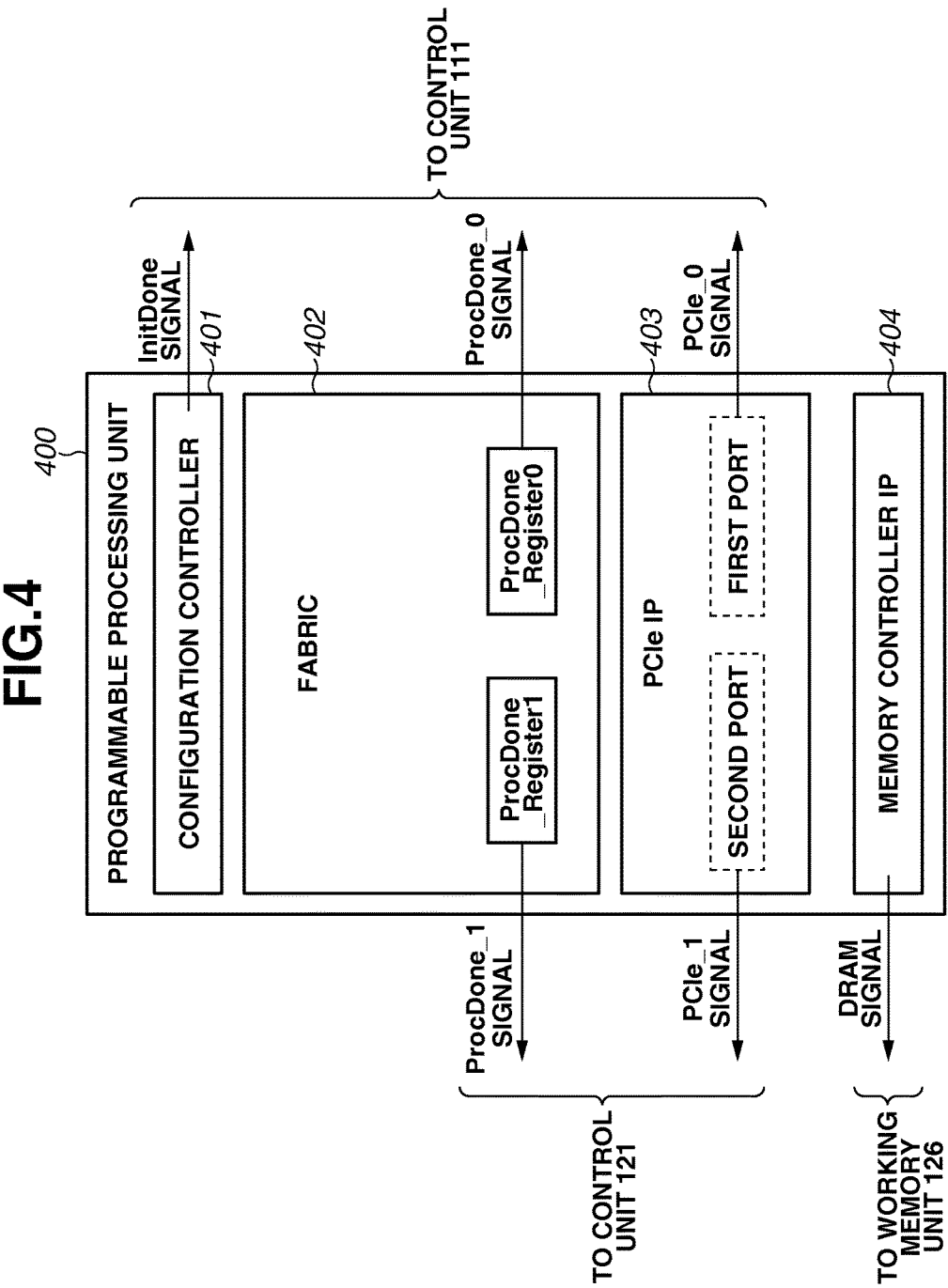

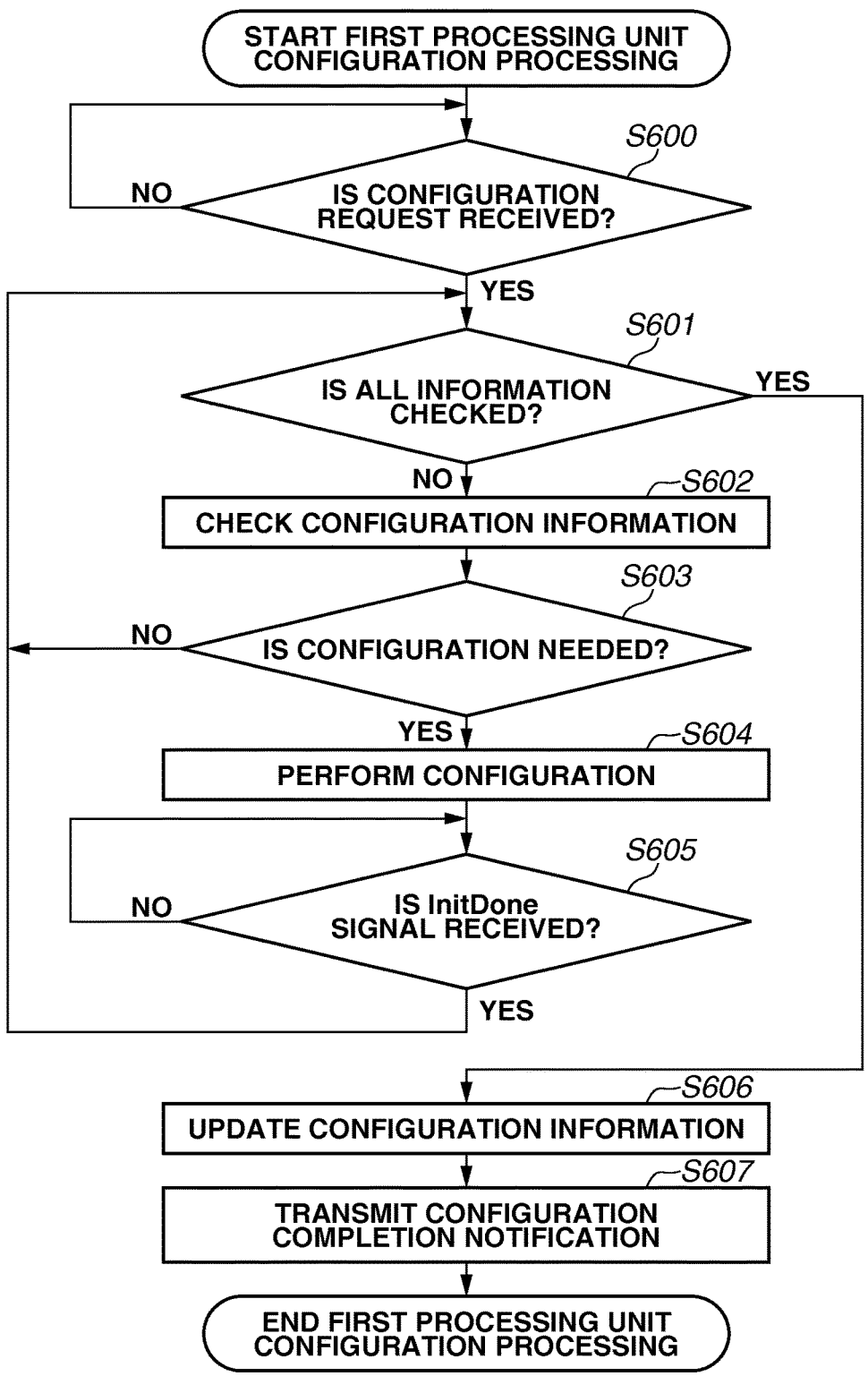

| CURRENT STATE | ELAPSED TIME | DEGREE OF PROGRESS OF PROCESSING |
|---|---|---|
| Idle | 3 min | — |

702

| SHIFT DESTINATION CANDIDATE | CIRCUIT INFORMATION | SUPPORT DEVICE |
|---|---|---|
| Sleep | ADV_Sencing.config<br>ADV_Img_Process01.config<br>ADV_Img_Process02.config | SECOND PROCESSING UNIT |
| Print | ADV_Sencing.config | SECOND PROCESSING UNIT |
| Print | ADV_Img_Process01.config<br>ADV_Img_Process02.config | SECOND PROCESSING UNIT<br>FIRST PROCESSING UNIT |
| Scan | ADV_OCR.config | FIRST PROCESSING UNIT |

INFORMATION PROCESSING SYSTEM INCLUDING DEVICE PROVIDED WITH CIRCUIT CAPABLE OF CONFIGURING LOGIC CIRCUIT ACCORDING TO CIRCUIT INFORMATION AND PLURALITY OF CONTROL UNITS

BACKGROUND OF THE INVENTION

Field of the Invention

One disclosed aspect of the embodiments relates an information processing system which includes a device and a plurality of control units, the device including a circuit capable of configuring a logic circuit according to circuit information.

Description of the Related Art

Programmable logic devices capable of changing an internal logic circuit configuration, such as a complex programmable logic device (CPLD) and a field programmable gate array (FPGA), are known. For example, an FPGA typically includes a fabric and a configuration memory. The fabric includes a plurality of logic blocks and a wiring area between the logic blocks. The FPGA includes an interface for transferring data between an inside and outside of the FPGA. Configuration data (also referred to as circuit information) can be written into the configuration memory to make the fabric (plurality of logic blocks) function as various logic circuits. The writing of circuit information to cause the fabric to function as a logic circuit will be referred to as configuration of the FPGA.

The FPGA fabric can implement various functions by configuration, can thus achieve both the high-speed performance of hardware and the flexibility of software in a compatible manner. Japanese Patent Application Laid-Open No. 2008-287571 discusses a system in which a plurality of central processing units (CPUs) shares a configured FPGA.

Some programmable logic devices include an intellectual property (IP) core (hereinafter, referred to as port) of a bus interface (for example, Peripheral Component Interconnect Express (PCI Express, or PCIe) bus) for achieving high-speed data communication. A CPU connected to the port of such a device can transmit data to be processed by a logic circuit to the device via the port at high speed. If an FPGA including a plurality of such high-speed ports is shared by a plurality of CPUs, each port can be connected with different CPUs. The CPUs can transmit data to the corresponding ports without the intervention of the other CPUs (i.e., independently) and process the data by using logic circuits.

Recent programmable logic devices are capable of performing device configuration from a CPU that transmits circuit information to the devices via the high-speed ports.

Some programmable logic devices may have a port that can receive circuit information from a CPU but does not support configuration using the circuit information. In such a case, a configuration mechanism is needed for a CPU to which no configuration-capable high-speed port is assigned.

In addition, even if a device can be configured from any of a plurality of high-speed ports to which different CPUs are connected, each CPU needs to perform control to avoid conflict with the configuration performed by other CPUs. For example, each CPU needs to perform control to prohibit all the other CPUs from performing configuration.

SUMMARY OF THE INVENTION

One disclosed aspect of the embodiments is directed to solving at least any one of the foregoing problems.

According to an aspect of the embodiments, an information processing system includes a device including a circuit for configuring a logic circuit according to circuit information, a first control unit configured to process a first job by using a first logic circuit configured in the circuit according to first circuit information, the first control unit being connected to the device, and a second control unit configured to process a second job by using a second logic circuit configured in the circuit according to second circuit information, the second control unit being connected to the device, wherein the device can configure a logic circuit in the circuit according to circuit information transmitted from the first control unit, and wherein the first control unit transmits the first circuit information to the device to configure the first logic circuit in the circuit, and transmits the second circuit information to the device to configure the second logic circuit in the circuit.

Further features of the disclosure will become apparent from the following description of exemplary embodiments with reference to the attached drawings.

BRIEF DESCRIPTION OF THE DRAWINGS

FIG. 1 is an overall block diagram of an information processing system.

FIGS. 2A, 2B and 2C illustrate an example of job data and an example of a job request function correspondence table.

FIGS. 3A and 3B illustrate configuration examples of configuration information about a programmable processing unit.

FIG. 4 illustrates an example of an internal block diagram of the programmable processing unit.

FIG. 6 is a flowchart of configuration processing by a first processing unit.

FIG. 7 illustrates an example of a state transition table.

DESCRIPTION OF THE EMBODIMENTS

Figure 5:
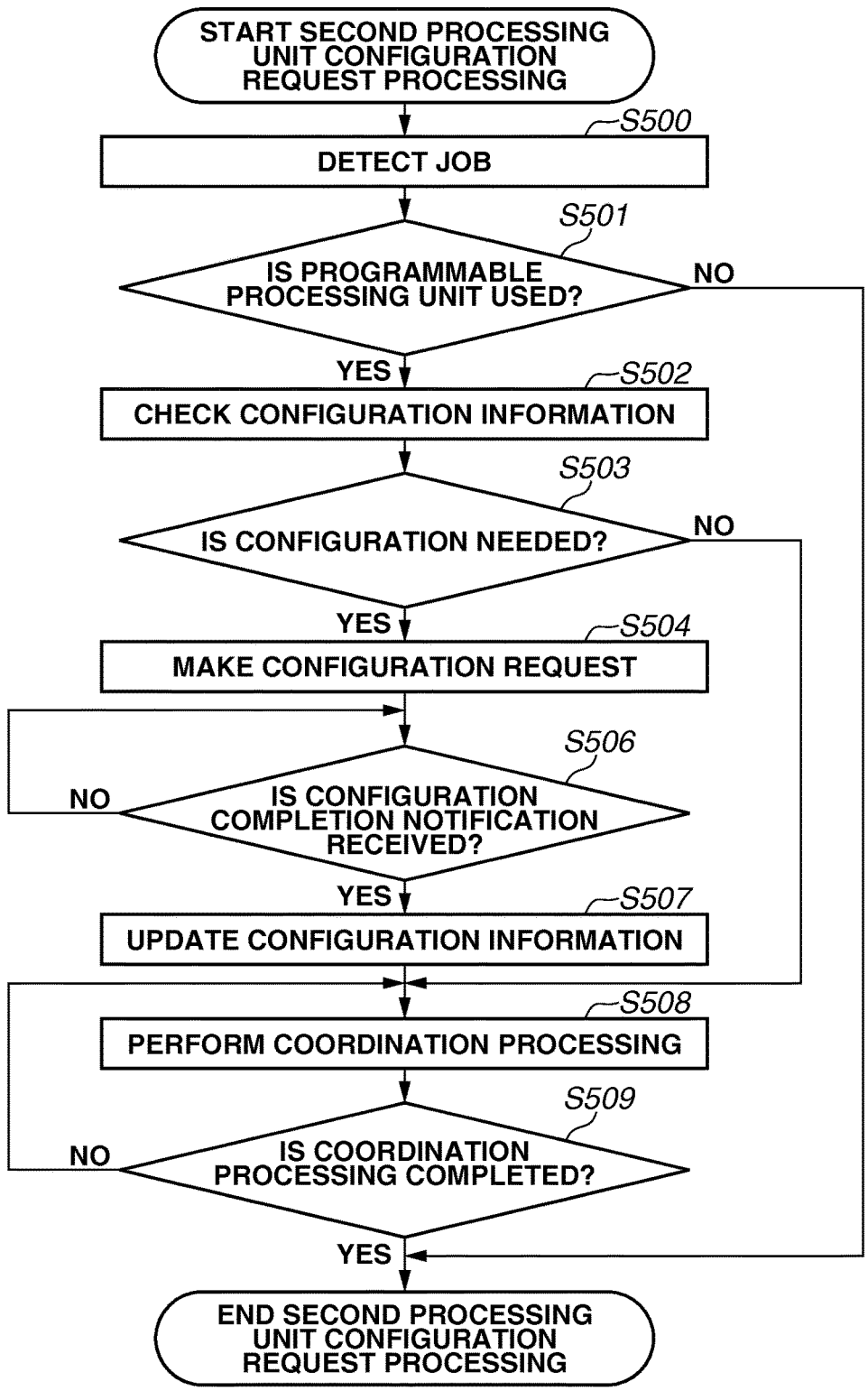
FIG. 5 is a flowchart of configuration request processing by a second processing unit.

Exemplary embodiments of the disclosure will be described below with reference to the drawings.

According to a first exemplary embodiment, there are two control units referred to as first and second control units. The second control unit transmits a configuration request to a first control unit when occurrence of a job is detected. Based on the received configuration request, the first control unit transmits circuit information about a logic circuit that the second control unit uses to process the job to an FPGA device via a PCIe bus. The FPGA device then configures the logic circuit according to the transmitted circuit information. The second control unit processes the job by using the configured logic circuit.

In other words, the first control unit transmits the circuit information about the logic circuit needed to process the job to the FPGA device based on the detection of the occurrence of the job to be processed by the second control unit.

From another point of view, the first control unit transmits the circuit information about the logic to the FPGA device via the PCIe bus even if the first control unit does not use the logic circuit to process the job.

In the following description of all the exemplary embodiments, "process a job" refers to processing of data to be processed by the job. "Control unit processes a job by using a logic circuit" means that the control unit transmits data to be processed by the job to the FPGA device, the logic circuit on the FPGA device processes the data, and the control unit receives the processing result.

<Overall Configuration of System>

FIG. 1 is an overall block diagram of an image processing system 100 which is an example of an information processing system according to the present exemplary embodiment. The image processing system 100 according to the present exemplary embodiment includes at least two or more processing units (control units) for processing a job.

A first processing unit 110 performs an operation control of the image processing system 100 and basic image processing such as color space conversion and halftoning. The first processing unit 110 is typically referred to as a main controller or a motherboard. Internal blocks of the first processing unit 110 are described below.

A control unit 111 is a CPU for controlling the first processing unit 110. The control unit 111 includes at least one port connected to a PCIe bus. The PCIe port is electrically connected to a PCIe IP 403 (first port to be described below) of a programmable processing unit 400 described below via the PCIe bus. The control unit 111 transmits data to be processed by a job and circuit information described below from the PCIe port to the programmable processing unit 400 (first port to be described below) via the PCIe bus. For example, the control unit 111 transmits first circuit information to the programmable processing unit 400 (first port described below) via the PCIe bus, so that a first logic circuit is configured in the programmable processing unit 400 according to the first circuit information. The control unit 111 transmits data to be processed by a first job to the programmable processing unit 400 (first port to be described below) via the PCIe bus. The control unit 111 then receives data (processing result) processed by the first logic circuit from the programmable processing unit 400 (first port described below). Through such a procedure, the control unit 111 processes the data (i.e., first job) by using the first logic circuit.

A main storage unit 112 is a storage device capable of high-speed access, including a synchronous dynamic random access memory (SDRAM). The main storage unit 112 stores image data and print data for the control unit 111 to process, as well as software programs for the control unit 111 to execute. The main storage unit 112 also stores circuit information to be written to the programmable processing unit 400 described below. In other words, the main storage unit 112 stores at least circuit information about a logic circuit used for job processing by the first processing unit 110 (control unit 111) and circuit information about a logic circuit used for job processing by a second processing unit 120 (control unit 121). The main storage unit 112 including an SDRAM is a volatile memory. Therefore, data stored in the main storage unit 112 is read from a following auxiliary storage unit 113 and temporarily stored therein.

The auxiliary storage unit 113 is a nonvolatile storage device such as a hard disk and a flash memory. The auxiliary storage unit 113 stores image data, print data, software programs, and circuit information to be read into the main storage unit 112.

An external interface (IF) unit 114 is an interface corresponding to Ethernet (registered trademark) and Universal Serial Bus (USB). In FIG. 1, the first processing unit 110 is connected to the second processing unit 120 via the external IF unit 114. However, the first processing unit 110 may be connected to an external information terminal such as a network server and a client personal computer (PC).

An operation display unit 115 is a touch screen or other device that has both a display function and an operation function. The operation display unit 115 functions as a user interface unit of the first processing unit 110. A liquid crystal display and hardware keys may be combined to constitute the operation display unit 115.

The foregoing units are electrically connected to each other via a system bus 116.

The second processing unit 120 is configured to perform processing of different types from those of the first processing unit 110, and/or perform processing of the same types as those of the first processing unit 110 at higher speed. The second processing unit 120 is typically referred to as add-on hardware or an accelerator. Internal blocks of the second processing unit 120 are described below.

The control unit 121 is a CPU for controlling the second processing unit 120. The control unit 121 includes at least one port for connecting to a PCIe bus. This PCIe port is electrically connected to a PCIe IP 403 (second port described below) of the programmable processing unit 400 to be described below via the PCIe bus. The control unit 121 transmits data to be processed by a job from the PCIe port to the programmable processing unit 400 via the PCIe bus. For example, the control unit 121 transmits data to be processed by a second job to the programmable processing unit 400 (second port to be described below) via the PCIe bus, so that the data (i.e., second job) is processed by using a second logic circuit configured in the programmable processing unit 400. As will be described below, the second logic circuit is configured in the programmable processing unit 400 according to second circuit information that the control unit 111 transmits to the programmable processing unit 400 (second port described below) via the PCIe bus.

The control unit 121 according to the present exemplary embodiment is directly connected to the control unit 111 via an inter-control unit communication interface (I/F) 132. However, the control unit 121 only needs to be electrically connected to the control unit 111 so that the control unit 121 can notify the control unit 111 of a signal.

A main storage unit 122 is a storage device including an SDRAM which can be accessed at a high speed. Data which the control unit 121 processes and software which the control unit 121 executes are loaded into the main storage unit 122.

An auxiliary storage unit 123 is a nonvolatile storage device such as a flash memory. The auxiliary storage unit 123 stores image data and software.

An external IF unit 124 is an interface corresponding to Ethernet (registered trademark) and USB. In FIG. 1, the second processing unit 120 is connected to only the first processing unit 110 via the external IF unit 124. However, the second processing unit 120 may be connected to an external information terminal such as a network server and a client PC.

A device input-output (IO) unit 125 is a data input-output unit compliant with communication bus standards such as USB and Thunderbolt (registered trademark). For example, a temperature sensor for monitoring ambient temperature and an image sensor for obtaining a surrounding condition as image data can be connected to the device IO unit 125.

The foregoing units are electrically connected to each other via a system bus 127.

The programmable processing unit 400 is connected to the control unit 111 via an interface 130, and connected to the control unit 121 via an interface 131. The interfaces 130 and 131 are a PCIe bus and an FPGA control bus, respectively. Details of the programmable processing unit 400 will be described below with reference to FIG. 4.

A working memory unit 126 is a storage device including an SDRAM which can be accessed at a high speed. The working memory unit 126 is connected to the programmable processing unit 400 and functions as a work memory device.

The inter-control unit communication I/F 132 is a data communication bus such as USB and Thunderbolt. The inter-control unit communication I/F 132 is used for job control between the control units 111 and 121 and for control information about configuration. As a modified example of the image processing system 100, a plurality of control units may perform data communication with each other via the external IF units 114 and 124 without the inter-control unit communication I/F 132.

The overall block diagram of the image processing system 100 according to the present exemplary embodiment has been described above.

<Configuration of Programmable Processing Unit 400>

The programmable processing unit 400 is a programmable logic device of which an internal logic circuit configuration is programmable. In the present exemplary embodiment, the programmable processing unit 400 is described by using an FPGA as an example. However, the programmable processing unit 400 may be a CPLD or other programmable logic device of which a logic circuit configuration is programmable.

The programmable processing unit 400 according to the present exemplary embodiment includes a not-illustrated configuration memory and a fabric 402. The fabric 402 includes a plurality of logic blocks and a wiring area. A logic block includes a lookup table for determining an output with respect to an input, and a register for holding the output. The wiring area connects the logic blocks with each other, or connects the logic blocks with an interface to an external device (such as a PCIe IP core). If circuit information is written to the programmable processing unit 400, the lookup tables included in the logic blocks and the connection state of the wiring area are changed to constitute a logic circuit. The fabric 402 is sectioned into a plurality of regions. Each region can be dynamically reconfigured without affecting the contents of logic circuits configured in the other regions. The regions are uniquely identified by information for uniquely identifying the respective regions (such as identifiers PR1 and PR2).

FIG. 4 is an internal block diagram of the programmable processing unit 400 (FPGA) according to the present exemplary embodiment. The programmable processing unit 400 includes a configuration controller 401, the fabric 402, the PCIe IP 403, and a memory controller IP 404.

The configuration controller 401 writes circuit information received from the control unit 111 to the programmable processing unit 400 (performs configuration). If the configuration controller 401 detects completion of the configuration of the fabric 402, the configuration controller 401 outputs an InitDone signal to the control unit 111. The InitDone signal is a signal indicating the completion of configuration.

Logic circuits according to circuit information are configured in the fabric 402. In the present exemplary embodiment, a plurality of regions (such as PR1 and PR2) is prepared in the fabric 402 in advance, and logic circuits can be reconfigured in each region. The fabric 402 includes ProcDone_Register0 and ProcDone_Register1 which are registers for holding information indicating an execution end status of processing performed by the configured logic circuits. A ProcDone_0 signal from ProcDone_Register0 is output to the control unit 111. A ProcDone_1 signal from ProcDone_Register1 is output to the control unit 121.

The PCIe IP 403 is a protocol stack including the PCIe Physical Layer (PHY). The PCIe IP 403 includes at least two or more PCIe IP cores. Each IP core implements a corresponding PCIe connection. The PCIe IP 403 according to the present exemplary embodiment includes two PCIe IP cores (first port and second port) connected to the fabric 402. The first port implements a PCIe connection between the control unit 111 and the fabric 402. The second port implements a PCIe connection between the control unit 121 and the fabric 402.

In FIG. 4, a PCIe_0 signal and a PCIe_1 signal represent data transmission/reception signals and clock signals via the PCIe buses connected to the respective ports. The PCIe IP 403 transmits and receives the PCIe_0 signal to/from the control unit 111, and transmits and receives the PCIe_1 signal to/from the control unit 121. Such signals are used to communicate data between the control unit 111 or 121 and the programmable processing unit 400. The PCIe_0 signal in particular is also used when receiving circuit information transmitted from the control unit 111 for the purpose of configuration. That is, the control unit 111 can transmit circuit information and a configuration instruction according to the circuit information to the programmable processing unit 400 via the PCIe bus. Specifically, the control 111 inquires the programmable processing unit 400 whether configuration can be performed. If the control unit 111 in response receives information indicating that configuration can be performed from the programmable processing unit 400 via the PCIe bus, the control unit 111 transmits circuit information. In such a manner, the control unit 111 instructs the programmable processing unit 400 to perform configuration.

On the other hand, the PCIe_1 signal cannot be used to receive circuit information from the control unit 121 for the purpose of configuration. That is, the control unit 121 is configured to not (not able to) transmit a configuration instruction to the programmable processing unit 400 via the PCIe bus.

In other words, the programmable processing unit 400 is set to configure logic circuits in the fabric 402 according to circuit information transmitted from the control unit 111, but not to configure logic circuits in the fabric 402 according to circuit information transmitted from the control unit 121. Therefore, the control unit 111 transmits circuit information about a logic circuit to be used in the processing of a job by the processing unit 111 to the programmable processing unit 400 via the PCIe bus (interface 130). The control unit 111 also transmits circuit information about a logic circuit to be used in the processing of a job by the control unit 121 to the programmable processing unit 400 via the PCIe bus (interface 130).

The memory controller IP 404 is a memory interface including PHY and a controller conforming to a double data rate (DDR) specification. In FIG. 4, a DRAM signal represents a data signal, an address signal, and a clock signal. The DRAM signal is output to the working memory unit 126.

<Job Data Configuration>

FIG. 2A illustrates a data configuration example of job data. Job data refers to data generated for each job to be performed in the first processing unit 110 or the second processing unit 120. The job data includes information such as a job identifier (ID), a job request function, and job setting parameters.

The job ID is information unique to each job. The job data can be uniquely identified by referring to the job ID.

The job request function is information indicating a function needed to perform the job. Details will be described below.

The job setting parameters include image processing unit setting data and an image source. The image processing unit setting data includes values that are set when another piece of job data is generated triggered by the operation display unit 111, an external information terminal, or an already-running job. The image processing unit setting data includes an adjustment parameter selected or arbitrarily input by the user, and/or a value of an image processing parameter recorded in advance. For example, it is a density value or information about whether to select monochrome or full color. The image source indicates a location where image data to be processed in the job is stored, and a format of the image data. For example, the image source indicates image data stored in the main storage unit 112 or a stream of image data input from an external device. The format of the image data may be raw data, or an image data format such as Joint Photographic Experts Group (JPEG), Joint Bi-level Image Experts Group (JBIG), and Tagged Image File Format (TIFF). Any data format may be used.

FIG. 2B illustrates an example of a job request function correspondence table in which job request functions of jobs occurring on the side of the first processing unit 110 are associated with information related to the job request functions. This job request function correspondence table is stored in the auxiliary storage unit 113. The control unit 111 reads and stores the job request function correspondence table from the auxiliary storage unit 113 into the main storage unit 112 when the first processing unit 110 is activated.

A job request function column lists functions processable by the image processing system 100. A support device column lists devices that can perform the corresponding job request functions. A use of programmable processing unit column lists whether the programmable processing unit 400 needs to be used when performing the corresponding job request functions. A circuit information column lists information that can uniquely identify circuit information needed when performing the corresponding job request functions. Based on the information about the job request function in the job data and the job request function correspondence table of FIG. 2B, the control unit 111 can determine the device and circuit information for implementing the job request function.

FIG. 2C illustrates an example of a job request function correspondence table in which job request functions of jobs to be performed on the side of the second processing unit 120 are associated with information related to the job request functions. This job request function correspondence table is stored in the auxiliary storage unit 123. The control unit 121 reads and stores the job request function correspondence table from the auxiliary storage unit 123 into the main storage unit 122 when the second processing unit 120 is activated. The jobs to be performed on the side of the second processing unit 120 include jobs occurring in the second processing unit 120, as well as processing assigned from the first processing unit 110 to the second processing unit 120.

A job request function column lists functions processable by the image processing system 100. A use of programmable processing unit column lists whether the programmable processing unit 400 needs to be used when performing the corresponding job request functions. A circuit information column lists information that can uniquely identify circuit information needed when performing the corresponding job request functions. Based on the information about the job request function in the job data and the job request function corresponding table of FIG. 2C, the control unit 121 can determine the device and circuit information for implementing the job request function. The information about the jobs occurring in the second processing unit 120 managed by the job request function correspondence table, may include the same data as that of the job request function correspondence table of the first processing unit 110.

<Configuration Information of Programmable Processing Unit 400>

FIGS. 3A and 3B illustrate examples of configuration information indicating logic circuits configured in the programmable processing unit 400. The configuration information is stored in the main storage unit 112 by the control unit 111. The control unit 121 also stores configuration information in the main storage unit 122. The control units 111 and 121 can thus independently identify the functions of the logic circuits configured in the programmable processing unit 400 at that point in time without inquiring of the other control units. More specifically, when the first processing unit 110 (control unit 111) configures the programmable processing unit 400, the control unit 111 can refer to the configuration information and determine a region on the fabric 402 where a logic circuit is configured by writing circuit information. For example, the control unit 111 can identify a region on the fabric 402 which configures a logic circuit but is not used by any device, and write the circuit information to form another logic circuit in the identified region. In a similar fashion, the second processing unit 120 (control unit 121) is operated. That is, when the control unit 121 uses the programmable processing unit 400 to perform a job occurring in the second processing unit 120, the control unit 121 can refer to the configuration information and determine whether the programmable processing unit 400 needs to be configured. If it is determined that the programmable processing unit 400 needs to be configured, the control unit 121 may instruct the control unit 111 via the inter-control unit communication I/F 132 to write circuit information to configure a certain logic circuit in a certain region. Each configuration information stored in the main storage units 112 and 122 is updated each time the logic circuits configured in the programmable processing unit 400 change.

FIG. 3A will initially be described. FIG. 3B will be described below.

The configuration information illustrated in FIG. 3A includes three pieces of information (1), (2), and (3) in a record.

Information (1): Information in a partial region (PR) position column (left column in FIG. 3A) is intended to identify the position of each region (PR) on the fabric 402 of the programmable processing unit 400. A logic circuit can be configured in each region. Any information may be used as long as each region on the fabric 402 can be identified. For example, the regions (such as region names) and address data that enables access to the logic circuits may be used.

Information (2): Information in a support device column (center column in FIG. 3) is intended to identify the devices using the logic circuits configured in the regions on the fabric 402. In the present exemplary embodiment, the information is set to one of the "first processing unit," the "second processing unit," and "not applicable" (denoted by "-" in FIG. 3A).

Information (3): Information in a circuit information column (right column in FIG. 3A) is intended to identify the circuit information about the logic circuits configured in the corresponding regions on the fabric 402. For example, it is an identifier of the circuit information (such as data file names) or a location where the data is stored.

In the present exemplary embodiment, the configuration information is provided in both the first processing unit 110 and the second processing unit 120. However, an embodiment is not limited to such a layout. For example, the configuration information may be stored in either one of the main storage unit of the first processing unit 110 and the second processing unit 120, and the other processing unit may be configured to refer to the configuration information via the external IF units 114 and 124.

<About Control of First Exemplary Embodiment>

Control of the first exemplary embodiment will be described in the following manner.

A control flow of the control unit 121 will be described with reference to FIG. 5.

A control flow of the control unit 111 will be described with reference to FIG. 6.

A processing flow of cooperative operation of the control units 111 and 121 and the programmable processing unit 400 will be described with reference to FIG. 7.

<Control Flow of Control Unit 121>

FIG. 5 is a flowchart illustrating the control flow of the control unit 121. This control flow is performed by using the control unit 121 according to a program loaded into the main storage unit 122.

In step S500, the control unit 121 detects the occurrence of a job, and obtains a job request function from the job data illustrated in FIG. 2A.

A job occurs when job data is generated by an application executed by the control unit 121. Alternatively, a job occurs when the control unit 121 receives job data generated by another control unit (for example, the control unit 111). For example, if a new camera device is connected to the device IO unit 125 and processing of image data transmitted from the camera device is newly required, a new job is generated as a job request function for the image processing in the camera device. Then, required processing such as configuration for enabling camera image processing, is started. The connected device is not limited to a camera. Further, the event that triggers the generation of a job is not limited to the connection of a device to the device IO unit 125.

In step S501, the control unit 121 determines whether to use the programmable processing unit 400, based on the job request function obtained in step S500 and the job request function correspondence table illustrated in FIG. 2C. Specifically, the control unit 121 identifies a record of FIG. 2C that includes the job request function obtained in step S500, and refers to the use of programmable processing unit column of the identified record. If the use of programmable processing unit column is "yes," the control unit 121 determines to use the programmable processing unit 400 (YES in step S501), and the processing proceeds to step S502. On the other hand, if the use of programmable processing unit column is "no," the control unit 121 determines not to use the programmable processing unit 400 (NO in step S501), and the processing ends.

In step S502, the control unit 121 checks the configuration information (FIG. 3A) stored in the main storage unit 122. Specifically, the control unit 121 searches for the record of FIG. 2C that includes the job request function obtained in step S500. If there is no applicable record, the control unit 121 obtains "not applicable" as information about the support device. If there is an applicable record, the control unit 121 refers to the circuit information column of the record of FIG. 2C, and obtains the information for identifying the circuit information. Next, the control unit 121 identifies a record or records of the configuration information of FIG. 3A that include(s) the obtained information, and obtains the information in the support device column of the identified record(s). For example, if the job request function is "sensor processing 2," the circuit information column of the record of FIG. 2C includes three pieces of information "ADV_Sencing.config," "ADV_Img_Process01.config," and "ADV_Img_Process02.config." Of these, "ADV_Sencing.config" has no applicable record in the configuration information of FIG. 3A, and information "not applicable" is obtained.

In step S503, if the information obtained in step S502 is the "first processing unit" or "not applicable," the control unit 121 determines that configuration is needed (YES in step S503), and the processing proceeds to step S504. On the other hand, if the support device referred to in step S502 is the second processing unit, the control unit 121 determines that configuration is not needed (NO in step S503), and the processing proceeds to step S508.

In step S504, the control unit 121 makes a configuration request to the control unit 111 via the inter-control unit communication I/F 132. The configuration request includes the information in the circuit information column (information for identifying needed circuit information) of the record of FIG. 2C that includes the job request function obtained in step S500. For example, if the job request function is the "sensor processing 2," the configuration request includes three pieces of information "ADV_Sencing.config," "ADV_Img_Process01.config," and "ADV_Img_Process02.config." Then, the processing proceeds to step S506.

In step S506, the control unit 121 determines whether a configuration completion notification is received from the control unit 111 via the inter-control unit communication I/F 132. If the configuration completion notification is received (YES in step S506), the processing proceeds to step S507. If the configuration completion notification is not received (NO in step S506), the processing loops to step S506. That is, the processing waits until the configuration completion notification is received. The configuration completion notification includes information to be used to update the configuration information stored in the control unit 121 (information indicating that a logic circuit according to certain circuit information being used by a certain device, is configured in a certain PR position).

In step S507, the control unit 121 updates the configuration information (FIG. 3A) stored in the main storage unit 122 in response to the configuration completion notification. For example, suppose that the configuration completion notification includes information indicating that "a logic circuit corresponding to "ADV_Sencing.config" is configured in a region PR6 and is used by the second processing unit 120." In such a case, the control unit 121 updates the configuration information of the main storage unit 122 from FIG. 3A to FIG. 3B. That is, the record of the region PR6 in the configuration information of the main storage unit 122 is updated. Then, the processing proceeds to step S508.

In step S508, the control unit 121 processes the job occurring in step S500 by using the desired logic circuit(s) configured in the fabric 402 of the programmable processing unit 400. In other words, the control unit 121 processes the job by using the logic circuit(s) of the programmable processing unit 400 (performs coordination processing). The logic circuit configured in the fabric 402 which is to be used is determined based on the information included in the configuration completion notification that indicates a PR position where the logic circuit is configured. In the coordination processing, the control unit 121 transmits data to be processed by the job to the programmable processing unit 400 (second port) via the PCIe bus. The programmable processing unit 400 (second port) then transmits processing result data to the control unit 121, and ends the execution of the job. If the execution of the job is ended, ProcDone_Register1 of the programmable processing unit 400 transmits the ProcDone_1 signal to the control unit 121.

In step S509, the control unit 121 determines whether the coordination processing is completed. Specifically, the control unit 121 determines whether the ProcDone_1 signal has been received. If the ProcDone_1 signal has been received (YES in step S509), the present flow ends. If not (NO in step S509), the processing loops to step S508. That is, the processing waits until the processing of the job by the coordination processing ends.

The control flow of the control unit 121 has been described above.

<Control Flow of Control Unit 111>

FIG. 6 is a flowchart illustrating the control flow of the control unit 111. This control flow is performed by the control unit 111 according to a program loaded into the main storage unit 112.

In step S600, the control unit 111 determines whether the configuration request of step S504 has been received from the control unit 121 via the inter-control unit communication I/F 132. If the configuration request has been received (YES in step S600), the processing proceeds to step S602. If the configuration request has not been received (NO in step S600), the processing loops to step S600. That is, the processing waits until the configuration request is received.

In step S601, the control unit 111 determines whether all information (information for identifying circuit information) included in the configuration request received in step S600 has been checked. For example, if the configuration request includes three pieces of information "ADV_Sencing.config," "ADV_Img_Process01.config," and "ADV_Img_Process02.config," the control unit 111 determines whether each of the pieces of information has been subjected to the subsequent processing of step S602 and subsequent steps. If all the information is checked (YES in step S601), the processing proceeds to step S606. If not (NO in step S601), the control unit 111 identifies unchecked information among the pieces of information included in the configuration request, and performs the processing of step S602 and subsequent steps on the identified information.

In step S602, the control unit 111 checks the configuration information (FIG. 3A) stored in the main storage unit 112. Specifically, the control unit 111 searches the configuration information of FIG. 3A for a record that includes the information identified in step S601 (information for identifying circuit information).

If there is no applicable record, the desired logic circuit is not configured. The control unit 111 thus determines that configuration according to the circuit information is needed.

If there is an applicable record, the control unit 111 refers to the information in the support device column of that record. The control unit 111 determines whether the support device indicated in the information is either the "processing unit from which the configuration request has been transmitted (in the present exemplary embodiment, the second processing unit 120)" or "not applicable."

If the support device is the "processing unit from which the configuration request has been transmitted" or "not applicable," the desired logic circuit has already been configured in a state immediately usable by the "processing unit from which the configuration request has been transmitted." The control unit 111 then determines that the configuration according to the circuit information is not needed.

On the other hand, if the support device is a "processing unit different from the processing unit from which the configuration request has been transmitted (in the present exemplary embodiment, the first processing unit 110)," the desired logic circuit has already been configured but is not in the state immediately usable by the "processing unit from which the configuration request has been transmitted." The control unit 111 then determines that the configuration according to the circuit information is needed.

In step S603, the control unit 111 branches the processing based on the determination result in step S602. More specifically, if the configuration according to the circuit information is needed (YES in step S603), the processing proceeds to step S604. If not (NO in step S603), the processing proceeds to step S601. The reason why the configuration needs to be determined again after the reception of the configuration request is that the state of configuration of the programmable processing unit 400 may have changed from the point in time of step S503 where the necessity of the configuration has been determined. For example, even if at the point in time of step S503 the configuration has been determined as necessary because the control unit 111 is using a logic circuit, the control unit 111 may have finished using the logic circuit at the point in time of step S603. In such a case, it is determined that the configuration is not needed.

In step S604, the control unit 111 instructs the programmable processing unit 400 to perform the configuration based on the information identified in step S601 (information for identifying circuit information). Specifically, the control unit 111 initially identifies the circuit information to be written (for example, ADV_Sencing.config) from the information identified in step S601. The control unit 111 then searches the fabric 402 for a free region (for example, region PR6) in which to configure the logic circuit, and notifies the configuration controller 401 of the region. The control unit 111 then notifies the configuration controller 401 of transmission of the circuit information about the logic circuit to be configured in the region (for example, region PR6) of the fabric 402 via the first port of the PCIe IP 403 by using the PCIe_0 signal. The control unit 111 then transmits the circuit information stored in the main storage unit 112 to the programmable processing unit 400 via the first port of the PCIe IP 403. The configuration controller 401 writes the circuit information received via the first port of the PCIe IP 403 into the programmable processing unit 400. In such a procedure, the programmable processing unit 400 performs configuration. When the configuration is completed, the configuration controller 401 transmits the InitDone signal to the control unit 111.

In step S605, the control unit 111 determines whether the InitDone signal has been received from the programmable processing unit 400. If the InitDone signal has been received (YES in step S605), the processing proceeds to step S601. If not (NO in step S605), the processing loops to step S605. That is, the processing waits unit the InitDone signal is received.

In step S606, the control unit 111 updates the configuration information (FIG. 3A) stored in the main storage unit 112 with the latest information with respect to all the information (information for identifying circuit information) included in the configuration request received in step S600. There are two cases where the update is performed.

In a first case, the control unit 111, in step S604, instructs the programmable processing unit 400 to perform configuration with respect to the information identified in step S601.

In a second case, the control unit 111, in step S603, determines that the support device is the "processing unit from which the configuration request has been transmitted" or "not applicable" and configuration is not needed.

In the first case, the control unit 111 updates the configuration information (FIG. 3A) with the information identified in step S601, thereby obtaining the configuration information on which the configuration of the configured programmable processing unit 400 is reflected (for example, FIG. 3B). For example, the control unit 111 adds information indicating that the circuit information identified by ADV_Sencing.config is written to the region PR6 where the support device is the second processing unit.

In the second case, the control unit 111 updates only the support device column of the configuration information with the information identified in step S601. This is because the logic circuit needed by the control unit 121 has already been configured in the fabric 402 and thus the configuration is not performed, but the information about the support device needs to be updated.

In step S607, the control unit 111 transmits a configuration completion notification to the control unit 121 via the inter-control unit communication I/F 132. Note that the information included in the configuration completion notification differs between the two cases described in step S606.

In the foregoing first case, the control unit 111 includes information about the fabric 402 changed by the configuration in the configuration completion notification. More specifically, the configuration completion notification includes information indicating that the logic circuit according to certain circuit information being used by a certain device, is configured in a certain PR position.

In the foregoing second case, the control unit 111 includes in the configuration completion notification the information about the record in which the information in the support device column, with respect to the configuration information stored in the main storage unit 112 has been changed.

The control flow of the control unit 111 according to the present exemplary embodiment has been described above.

According to the first exemplary embodiment, based on the detection of the occurrence of a job to be processed by the control unit 121, the control unit 111 transmits circuit information about a logic circuit needed for the processing of the job to the programmable processing unit 400 so that the job is processed by the control unit 121. In other words, in the first exemplary embodiment, the configuration processing is started "after the occurrence of the job to be processed by the control unit 121 is detected."

In a second exemplary embodiment, configuration processing is started "before the occurrence of a job to be processed by the control unit 121 is detected."

Figure 8:
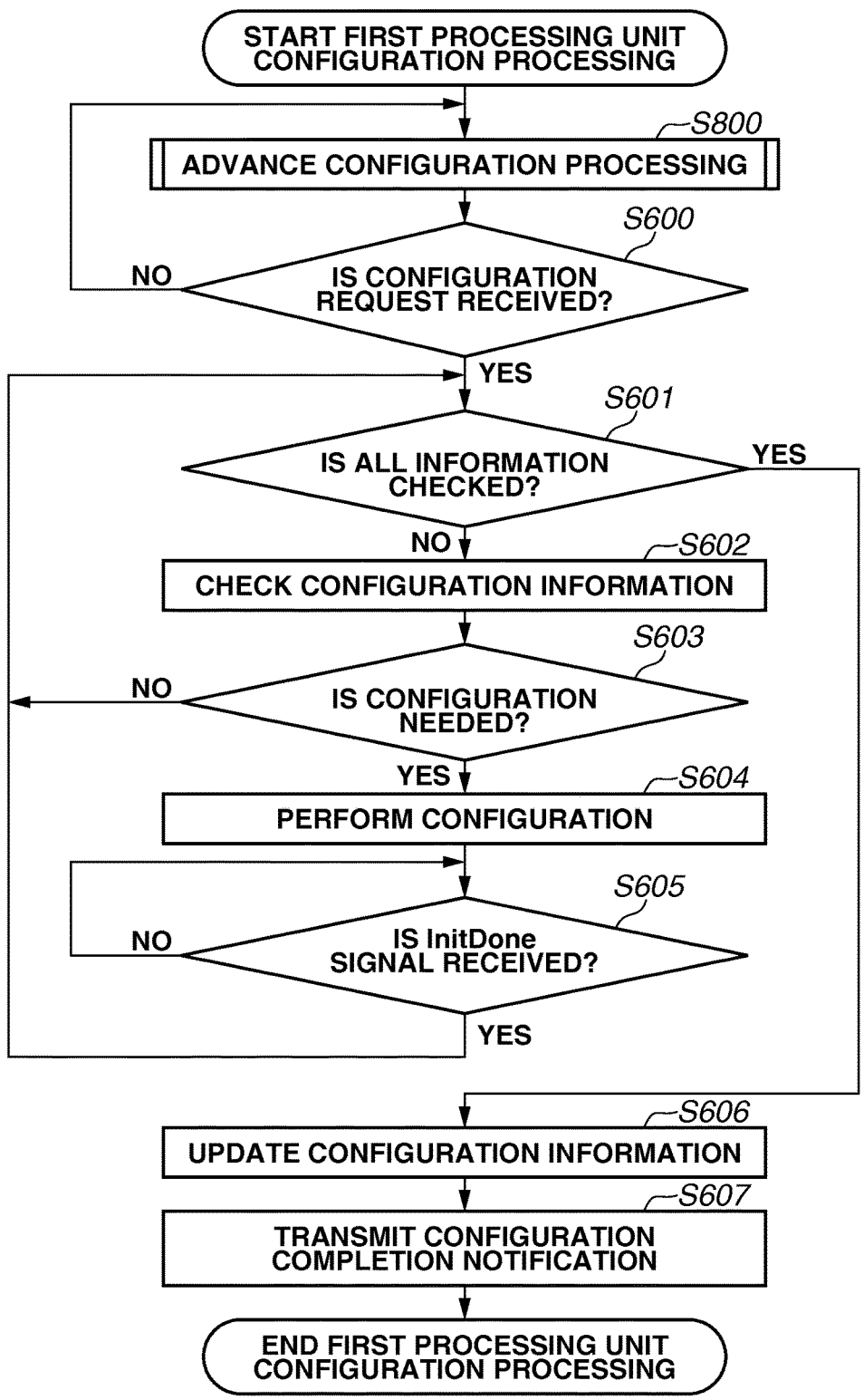
FIG. 8 is a flowchart of configuration processing by the first processing unit including advance configuration processing.

Such an operation is achieved by performing processing of the flowchart of FIG. 8. The processing of the flowchart of FIG. 8 is performed by the control unit 111 according to a program loaded into the main storage unit 112. In other words, the operation is achieved by the control unit 111 performing advance configuration processing (step S800) while waiting for the processing of step S600 in the flowchart of FIG. 6.

The advance configuration processing refers to processing in which the control unit 111 transmits circuit information about a logic circuit that the control unit 121 uses to process a job, to the programmable processing unit 400 before the occurrence of the job to be processed by the control unit 121 is detected. Details of the advance configuration processing (step S800) will be described with reference to the flowchart of FIG. 9.

By performing the advance configuration processing, in the present exemplary embodiment, the control unit 111 can thus transmit the circuit information about the logic circuit that the control unit 121 uses to process the job, to the programmable processing unit 400 similar to the first exemplary embodiment. Moreover, in the present exemplary embodiment, since the configuration processing is started before the occurrence of the job to be processed by the control unit 121 is detected, the configuration processing can be completed earlier than in a case where the configuration processing is started after the occurrence of the job is detected. In other words, the processing of the job by the control unit 121 using the logic circuit) can be started earlier. Similarly, the processing of a job by the control unit 111 using a logic circuits can also be started earlier.

<Advance Configuration Processing>

Figure 9:
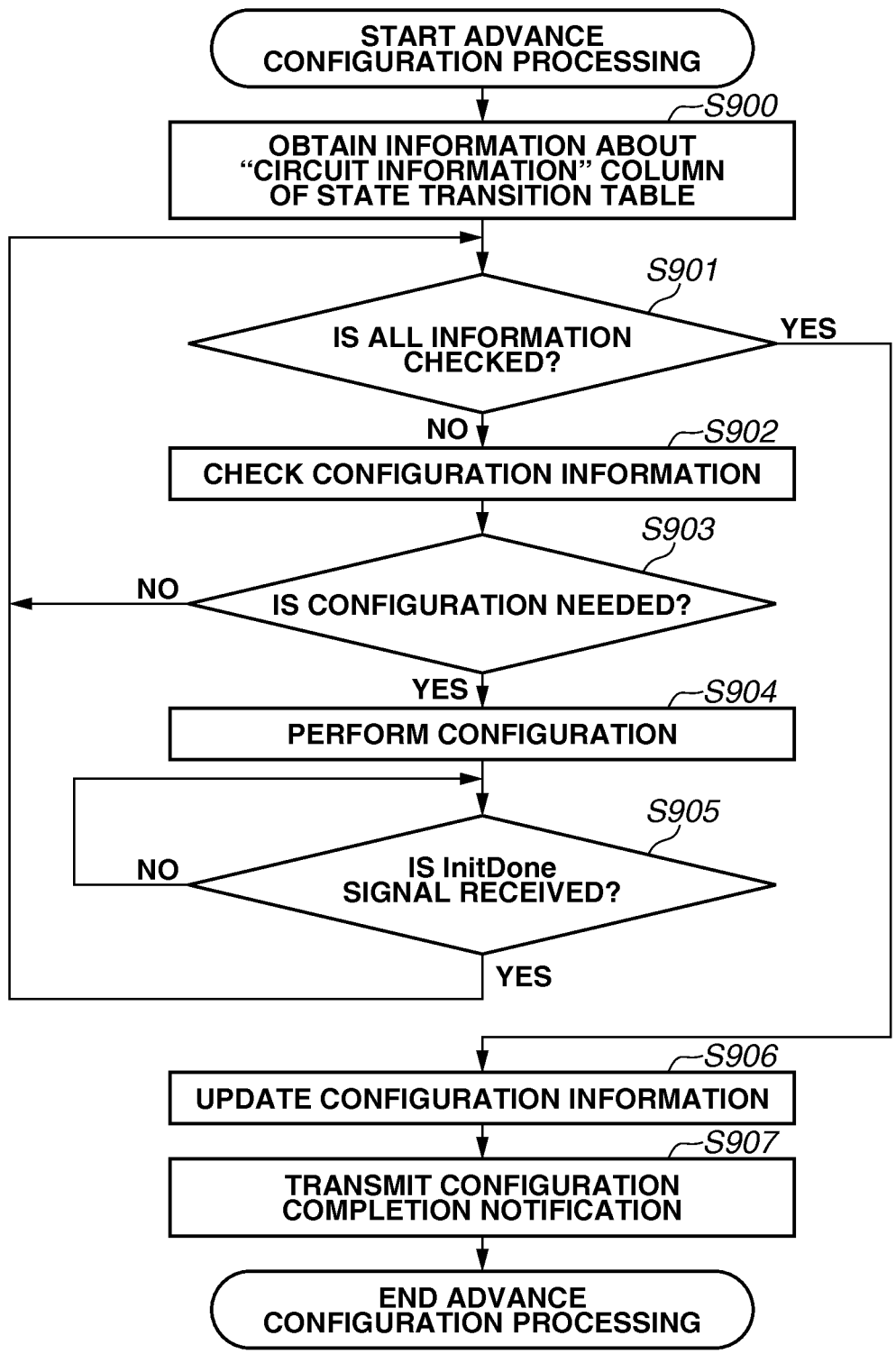
FIG. 9 is a flowchart of the advance configuration processing.

The advance configuration processing will be described with reference to FIGS. 7 and 9.

FIG. 7 illustrates an example of a state transition table which is used to perform the advance configuration processing according to the present exemplary embodiment. The state transition table is used to predict a logic circuit to be used in the next processing of a job to which the current state of the image processing system 100 shifts (in particular, a logic circuit to be used in the processing of a job by the control unit 121). The control unit 111 then transmits the circuit information about the logic circuit predicted to be used, to the programmable processing unit 400 before the occurrence of the job (in particular, the job to be processed by the control unit 121) is detected. FIG. 9 is a flowchart illustrating specific processing of a serial flow.

[State Transition Table]

Details of the state transition table will be described with reference to FIG. 7. In the present exemplary embodiment, state transition tables are stored in the main storage unit 112. The control unit 111 obtains an appropriate state transition table 702 according to the current state (state table 701) of the image processing system 100. The state transition table 702 is a table related to states to which the image processing system 100 (in particular, the first processing unit 110) can shift from the current state.

The state table 701 is stored in the main storage unit 112 and managed by the control unit 111. More specifically, the control unit 111 monitors the state of the image processing system 100 at predetermined timing, and updates the state table 701 with information about the state of the image processing system 100. The state table 701 includes the current state of the image processing system 100, time that has elapsed in the current state, and if the current state involves specific processing, the degree of progress of the processing. In the state table 701 of FIG. 7, the current state of the image processing system 100 is "idle" which indicates that no specific processing is being performed. The time that has elapsed in the current state is "3 minutes (3 min)." The degree of progress of processing is empty since no specific processing is being performed in the current state.

The state transition table 702 includes shift destination candidate, circuit information, and support device columns. The shift destination candidate column lists candidates of a state to which the "current state" shown in the state table 701 can shift. In other words, state transition tables 702 are stored in association with "current states" so that an appropriate state transition table 702 can be identified from the "current state" of the state table 701. The contents of the shift destination candidates are therefore not fixed but vary depending on the current state. For example, if the current state of the state table 701 is "idle," a state transition table 702 indicating "sleep," "print," and "scan" as the candidates of the destination state is identified.

Each shift destination candidate of the state transition table 702 is included in a different record. Each record includes the circuit information and support device columns in addition to the shift destination candidate column. The circuit information column included in the record of a shift destination candidate includes information for identifying circuit information about a logic circuit predicted to be used in that candidate state. The support device column includes information for identifying a device (such as the control unit 111 (first processing unit 110) and the control unit 111 (second processing unit 120)) that uses the logic circuit predicted to be used in the candidate state. For example, the circuit information column of the record including the shift destination candidate "sleep" includes information (for example, identifier "ADV_Sencing.config") for identifying circuit information about a logic circuit predicted to be used by the support device when the image processing system 100 (first processing unit 110) is in the state "sleep." Similarly, identifiers "ADV_Img_Process01.config" and "ADV_Img_Process02.config" are also included in the circuit information column of the same record. The support device column of the record includes information for identifying the "second processing unit (control unit 121)" which is predicted to use the logic circuits implemented by the circuit information identified by the foregoing three identifiers for job processing.

For example, the circuit information in the record where the shift destination candidate is "print" includes three identifiers. The logic circuit corresponding to one of the three identifiers, "ADV_Sencing.config," is predicted to be used by the "second processing unit." The identification information about the circuit information, "ADV_Sencing-.config," is thus associated with the identification information about the support device, "second processing unit," in the record. The logic circuits corresponding to the remaining two identifiers "ADV_Img_Process01.config" and "ADV_Img_Process02.config" are both predicted to be used not only by the "second processing unit" but by the "first processing unit (control unit 111)" as well. The two pieces of identification information about the circuit information, "ADV_Img_Process01.config" and "ADV_Img_Process02.config," are therefore associated with the two pieces of identification information about the support devices, "second processing unit" and "first processing unit," in the record.

That is, the state transition table 702 functions as information indicating association between the state of the image processing system 100 at that point in time and predetermined circuit information corresponding to the shift destination candidates.

[Flow of Advance Configuration Processing]

A flow of the advance configuration processing will be described with reference to FIG. 9.

In step S900, the control unit 111 obtains an appropriate state transition table 702 according to the current state of the image processing system 100, and obtains the information in the "circuit information" column of the obtained state transition table 702. In other words, this processing corresponds to processing for identifying at least a piece of circuit information according to the current state of the image processing system 100 among a plurality of pieces of circuit information. The processing then proceeds to step S901.

Specifically, the control unit 111 refers to the "current state" column of the state table 701 stored in the main storage unit 112, and obtains the state transition table 702 associated with the information in the "current state" column from the main storage unit 112. For example, if the information in the "current state" column is "idle," the state transition table 702 illustrated in FIG. 7 is obtained. The control unit 111 then obtains the information in the "circuit information" column of the obtained state transition table 702.

For example, the control unit 111 may obtain all the information in the "circuit information" column of the state transition table 702.

Alternatively, the control unit 111 may refer to the information in the "elapsed time" column and/or the information in the "degree of progress of processing" column of the state transition table 702, and determine the information to obtain based on the referred information. For example, suppose that the current state is "idle" and the "elapsed time" has exceeded a predetermined threshold. In such a case, the control unit 111 obtains the information in the "circuit information" column of the record where the "shift destination candidate" column is "sleep" in the state transition table 702, but not the information in the "circuit information" column of the records of "print" and "scan." The reason is that if the system state "idle" lasts long, the possibility that the system state shifts to "sleep" can be predicted to be higher than the possibilities of shifting to the other states. Now, suppose, for example, that the current state is "scan" and the "degree of progress of processing" has exceeded a predetermined threshold. In such a case, the control unit 111 obtains the information in the "circuit information" column of the record where the "shift destination candidate" column is "print" in the state transition table 702, but does not obtain the information in the "circuit information" column of the record of "sleep." The reason is that the possibility of shifting to "print" can be predicted to be higher than the possibility that the system state shifts to "sleep" immediately after exiting the state of "scan". In such a manner, the information to be obtained is determined based on the information in the "elapsed time" column and/or the information in the "degree of progress of processing" column of the state table 701. This can suppress writing of needless circuit information to the programmable processing unit 400 in configuration processing in a subsequent stage.

In step S901, the control unit 111 determines whether all information obtained in step S900 (information for identifying circuit information) is checked. For example, if the information obtained in step S900 includes two pieces of information, the control unit 111 determines whether each of the information has been subjected to the subsequent processing of step S902 and subsequent steps. If all the information is checked (YES in step S901), the processing proceeds to step S906. If not (NO in step S901), the control unit 111 identifies an unchecked piece of information among the pieces of information included in the information obtained in step S900, and performs the processing of step S902 and subsequent steps on the identified piece of information.

The processing of steps S902 to S907 corresponds to and is substantially equivalent to the processing of the foregoing steps S602 to S607, respectively. A difference lies in the following point. The processing of each of steps S602 to S607 deals with the information identified in step S601 (information for identifying circuit information). The processing of each of steps S902 to S907 deals with the information identified in step S901 (information for identifying circuit information).

The control flow of the control unit 111 according to the present exemplary embodiment has been described above.

<Modification of Second Exemplary Embodiment>

In the foregoing second exemplary embodiment, the control unit 111 performs the advance configuration processing (the processing of the flowchart of FIG. 9) while waiting for the reception of a configuration request (during the processing wait in step S600).

In the present modification, the control unit 111 performs the advance configuration processing at timing when the state of the image processing system 100 shifts to another state. More specifically, the control unit 111 detects that the state of the image processing system 100 shifts to another predetermined state. The control unit 111 then performs the advance configuration processing according to the detection.

Here, for example, the control unit 111 determines the information to be obtained in step S902 as the information in the "circuit information" column of the record corresponding to the predetermined state. For example, suppose that the control unit 111 performs the advance configuration processing at timing when the system state shifts from "idle" to "sleep." In such a case, the control unit 111 obtains, in step S902, only the information in the "circuit information" column of the record where the "shift destination candidate" is "sleep" in the state transition table 702. This can suppress writing of needless circuit information to the programmable processing unit 400 in the configuration processing of step S904.

The modification described here, or more specifically, the writing of the circuit information identified by the information in the "circuit information" column of the record of "sleep" into the programmable processing unit 400 in advance at the timing when the system state shifts to "sleep", achieves a special effect. For example, if the operation state of the image processing system 100 (first processing unit 110) shifts to "sleep," the image processing system 100 typically operates in a low power consumption state. In other words, the power consumption in the state "sleep" is lower than in the state "idle." In such a situation, a job occurring in the second processing unit 120 (control unit 121) may sometimes be processed desirably with the operation state of the first processing unit 110 (control unit 111) maintained in the low power consumption state.

For example, a camera device is connected to the device IO unit 125 and a job of image processing of image data transmitted from the camera device may occur in the second processing unit 120 (control unit 121). In such a case, if the logic circuit for the image processing is configured on the fabric 402 in advance, the second processing unit 120 (control unit 121) can start to process the job without transmitting a configuration request to the first processing unit 110 (control unit 111). As a result, the first processing unit 110 (control unit 111) does not receive a configuration request and therefore will not change the operation state of the image processing system 100 from "sleep" to perform configuration processing. In other words, the state "sleep" which is the low power consumption state can be maintained to reduce the power consumption of the entire image processing system 100.

In the foregoing modification, the timing when the system state shifts from "idle" to "sleep" is described as an example of the timing to perform the advance configuration processing. However, the timing is not limited thereto.

For example, the first processing unit 110 (control unit 111) transmits circuit information (first circuit information) to the programmable processing unit 400 (first port) via the PCIe bus, whereby a logic circuit corresponding to the circuit information is configured in the fabric 402. The first processing unit 110 (control unit 111) then performs a first job by using the configured logic circuit. Here, the state of the image processing system 100 shifts to a state indicating that the processing of the first job is in process. If the first processing unit 110 (control unit 111) completes the first job by using the logic circuit, the state of the image processing system 100 shifts to a state indicating that the processing of the first job is completed. In other words, the state of the image processing system 100 shifts from the in-process state of the first job to the completed state of the first job. As the state shifts, the control unit 111 transmits circuit information about a specific logic circuit predicted to be used to process a second job by the second processing unit 120 (control unit 121) to the programmable processing unit 400 (first port) via the PCIe bus. The programmable processing unit 400 then configures the predetermined logic circuit before the occurrence of the second job. The specific logic circuit may be any logic circuit. For example, the specific logic circuit may be the most frequently used one by the second processing unit 120 (control unit 121) in the past among a plurality of logic circuits. The specific logic circuit may also be the one specified by the user in advance. The specific logic circuit is configured in a free region of the fabric 402 if any. If there is no free region, the specific logic circuit may be configured in a region where the oldest logic circuit used by the control unit 111 is configured, or in a region where a logic circuit which is the least frequently used by the control unit 111 is configured. Even with such a configuration, the job processing performed by the second processing unit 120 (control unit 121) can quickly use the desired logic circuit. As a result, the job processing can be completed earlier.

The advance configuration processing according to the second exemplary embodiment is performed triggered by the first processing unit 110 (control unit 111). More specifically, during the processing wait of step S600, the control unit 111 predicts a transition of the operation state of the image processing system 100, and transmits the circuit information about the logic circuit predicted to be used by the job processing in the predicted transitioned state of the image processing system 100, to the programmable processing unit 400.

An image processing system according to a third exemplary embodiment performs advance configuration processing triggered by the second processing unit 120 (control unit 121). This advance configuration processing is performed before the detection of a job in step S500. The advance configuration processing by the control unit 121 includes substantially similar processing to steps S900 to S903. More specifically, through the processing of step S900, the control unit 121 obtains information for identifying circuit information about a predicted logic circuit. In steps S901 and S902, the control unit 121 checks the state of configuration of the fabric 402 with respect to each information obtained. In step S903, the control unit 121 checks whether the configuration processing of the circuit information is needed. If none of the information obtained needs to be configured, the processing ends. If any of the circuit information needs to be configured, the control unit 121 then performs the processing in steps S504 to S507 on the circuit information, and the processing ends.

Through such advance configuration processing, the second processing unit 120 (control unit 121) can transmit in advance the configuration request to the control unit 111 via the inter-control unit communication I/F 132.

Since the configuration request is thus made before the occurrence of a job, the configuration can be completed earlier and the job can be quickly processed by using the logic circuit of the programmable processing unit 400. Such an effect can be obtained regardless of the control unit 111 or the control unit 121 which processes the job.

(Other Exemplary Embodiments)

In the foregoing exemplary embodiments, the control unit 111 directly transmits the circuit information and the data to the programmable processing unit 400 (first port) via the PCIe bus. However, this is not restrictive. The control unit 111 may control a direct memory access (DMA) controller and transmit the circuit information and the data to the programmable processing unit 400 (first port) via the PCIe bus by using the DMA controller.

In the foregoing exemplary embodiments, the programmable processing unit 400 is not capable of performing configuration from the control unit 121 via the PCIe bus. However, an exemplary embodiment of the disclosure may be applied to a programmable processing unit 400 that can be configured by the control units 111 and 121 via respective corresponding PCIe buses. This can avoid the complexity of performing an arbitration control to permit or prohibit configuration between the control units 111 and 121.

According to the foregoing exemplary embodiments, in a system where a plurality of control units shares a programmable logic device for configuring the logic circuits according to circuit information, the programmable logic device can be configured without complicating the system.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2014-249432, filed Dec. 9, 2014, which is hereby incorporated by reference herein in its entirety.

What is claimed is:

1. An information processing system comprising:
   a device including a circuit to perform a configuration of a logic circuit according to circuit information;
   a first control unit configured to instruct the device to perform the configuration prior to or after receiving a configuration request for the configuration, the first control unit being connected to the device; and
   a second control unit separate from and different than the first control unit and configured to transmit, to the first control unit, the configuration request corresponding to a job request for a job of the second control unit after determining the configuration is necessary based on the job request, the second control unit being connected to the device,
   wherein the first control unit instructs the device after determining the configuration is necessary based on the configuration request, and
   wherein the second control unit processes the job using the configured logic circuit in the device.

2. The information processing system according to claim 1, further comprising a storage unit connected to the first control unit and configured to store the circuit information.

3. The information processing system according to claim 1, wherein the first control unit does not perform the configuration according to the circuit information from the second control unit.

4. The information processing system according to claim 1, wherein the device includes
   a first communication unit configured to receive data from the first control unit, the first communication unit being connected to the first control unit via a first communication path, and
   a second communication unit configured to receive data from the second control unit, the second communication unit being connected to the second control unit via a second communication path,
   wherein the first control unit is configured to transmit the circuit information to the first communication unit via the first communication path, and
   wherein the second control unit is configured to transmit data to be processed by the logic circuit to the second communication unit via the second communication path in processing of the job.

5. The information processing system according to claim 4, wherein the first control unit is configured to
   update configuration information after all information for identifying the circuit information is checked, and
   transmit a completion notification to the second control unit.

6. The information processing system according to claim 4, wherein the first control unit transmits an instruction to configure a logic circuit to the device via the first communication path, and
   wherein the second control unit does not transmit an instruction to configure a logic circuit to the device via the second communication path.

7. The information processing system according to claim 4, wherein the first communication path is a first PCI Express bus, and
   wherein the second communication path is a second PCI Express bus.

8. The information processing system according to claim 1, wherein the second control unit transmits to the first control unit a request to transmit second circuit information to the device to configure a second logic circuit in the circuit, and wherein the first control unit transmits the second circuit information to the device according to reception of the request from the second control unit.

9. The information processing system according to claim 8, wherein the request includes information for identifying the second circuit information.

10. The information processing system according to claim 9, wherein the first control unit transmits the second circuit information based on information indicating a logic circuit configured in the circuit.

11. The information processing system according to claim 8, wherein the second control unit transmits the request to the first control unit according to detection of occurrence of the job.

12. The information processing system according to claim 1, wherein the first control unit transmits the circuit information to the device before the job occurs.

13. The information processing system according to claim 12, wherein the first control unit identifies at least a piece of circuit information among a plurality of pieces of circuit information based on a state of the information processing system, and transmits the identified circuit information to the device as the circuit information.

14. The information processing system according to claim 13, further comprising:
a storage unit configured to store information indicating association between the state of the information processing system and predetermined circuit information; and
a checking unit configured to check the state of the information processing system,
wherein the first control unit transmits the circuit information identified based on the checked state and the information indicating the association, to the device as the circuit information.

15. The information processing system according to claim 13, wherein the first control unit transmits the circuit information to the device based on a transition of a state of the information processing system.

16. The information processing system according to claim 15, wherein the first control unit transmits the circuit information to the device based on the transition of the state of the information processing system from a first power consumption state to a second power consumption state, the second power consumption state being a state in which power consumption is lower than in the first power consumption state.

17. The information processing system according to claim 15, wherein the first control unit transmits the second circuit information to the device based on the transition of the state of the information processing system from a state where the processing of the job is in process to a state where the processing of the job is completed.

18. The information processing system according to claim 1, wherein the first control unit checks a logic circuit configured in the circuit, and transmits second circuit information to the device based on a result of the checking.

19. The information processing system according to claim 18, wherein the first control unit is configured to,
if the result of the checking indicates that a logic circuit corresponding to the circuit information is already configured in the circuit and is usable by the second control unit, not transmit the circuit information to the device, and
if the result of the checking indicates that the logic circuit corresponding to the circuit information is already configured in the circuit and is not usable by the second control unit, transmit the circuit information to the device.

20. The information processing system according to claim 1, wherein the device is a field programmable gate array (FPGA) or a complex programmable logic device (CPLD).

21. An information processing system comprising:
a first control unit configured to obtain information for identifying circuit information upon receiving a configuration request for a configuration and transmit the circuit information identified based on the obtained information;
a programmable logic device configured to receive the circuit information transmitted from the first control unit and perform the configuration of a logic circuit according to the circuit information; and
a second control unit separate from and different than the first control unit and configured to generate, to the first control unit, the configuration request corresponding to a job request for a job of the second control unit after determining the configuration is necessary based on the job request and upon detecting the job and process the job using the logic circuit configured by the programmable logic device.

* * * * *